United States Patent [19]

Lozito et al.

[11] Patent Number: 5,053,913
[45] Date of Patent: Oct. 1, 1991

[54] CAPACITIVE DISCHARGE IGNITION EXCITER USING SCR DISCHARGE SWITCHES

[75] Inventors: Roy Lozito, Orange Park; Steve Kempinski, Jacksonville; Michael A. Crough, Ponte Vedra Beach; Bruce E. Dolmovich, Jacksonville, all of Fla.

[73] Assignee: Unison Industries Limited Partnership, Jacksonville, Fla.

[21] Appl. No.: 312,215

[22] Filed: Feb. 17, 1989

[51] Int. Cl.⁵ .................................................. F23Q 3/00
[52] U.S. Cl. .................................... 361/257; 361/254; 361/256; 123/143 B
[58] Field of Search ............... 361/247, 253, 254, 255, 361/256, 257; 123/143 B, 598; 60/39.827, 39.141

[56] References Cited

U.S. PATENT DOCUMENTS

| | | | |
|---|---|---|---|
| 3,531,738 | 9/1970 | Thakore | 331/111 |
| 3,605,714 | 9/1971 | Hardin et al. | 123/598 |
| 3,619,638 | 11/1971 | Phinney | 307/86 |
| 4,398,128 | 8/1983 | Wollank | 315/158 |
| 4,432,646 | 11/1980 | Asai | 123/600 |
| 4,457,285 | 7/1984 | Hamai et al. | 123/598 |
| 4,705,013 | 11/1987 | Minks | 123/598 |
| 4,839,772 | 6/1989 | Choi et al. | 361/256 |
| 4,983,886 | 1/1991 | Balland | 361/257 |

OTHER PUBLICATIONS

Silicon Controlled Rectifier Designer's Handbook by Westinghouse Electric Corporation, (Sep. 1970), Leslie R. Rice, Editor, 2nd Edition, W.E. Semiconductor Division, Youngwood, Pa., pp. (9-1)-(9-5).

Primary Examiner—A. D. Pellinen
Assistant Examiner—Jeffrey A. Gaffin
Attorney, Agent, or Firm—Leydig, Voit & Mayer

[57] ABSTRACT

An exciter circuit for a gas turbine engine ignition system. A high voltage supply continuously charges a storage capacitor. A plurality of silicon controlled rectifiers (SCRs) are connected in series between the storage capacitor and a high voltage conditioning circuit. A multi-section protective network is connected in parallel with the series connected SCRs. Individual network sections are connected across separate ones of the SCRs. The SCRs are normally non-conducting and are periodically triggered to discharge the storage capacitor into the conditioning circuit. An igniter plug is connected to the output of the conditioning circuit. The protective network divides the voltage of the storage capacitor equally across the SCRs when the latter are non-conductive thereby reducing the voltage stress to which each of the SCRs is subjected.

14 Claims, 1 Drawing Sheet

CAPACITIVE DISCHARGE IGNITION EXCITER USING SCR DISCHARGE SWITCHES

FIELD OF THE INVENTION

The present invention relates to a capacitive discharge ignition exciter circuit for gas turbine engines. More particularly, it relates to an ignition exciter circuit which includes a high voltage storage capacitor and silicon controlled rectifiers (SCR) serving as a switch to connect the storage capacitor to the input of a conditioning circuit supplying high voltage, high energy pulses to an igniter plug located in the combustion chamber of a gas turbine engine.

BACKGROUND OF THE INVENTION

Capacitive discharge ignition exciter circuits in widespread use for gas turbine engines are of the types of variations of the types described in U.S. Pat. No. 3,619,638 "Pulse Generating Apparatus" by E. M. Phinney, issued Nov. 9, 1971 and in U.S. Pat. No. 3,531,738 "Continuous Duty Ignition System" by K. H. Thakore, issued Sept. 29, 1970. In each of the referenced exciters a control spark gap, not to be confused with the igniter plug spark gap, is used to initiate discharge of a storage capacitor into a conditioning circuit which transforms the discharge current from the storage capacitor in a high voltage, high energy pulse for supply to the engine igniter plug. The engine igniter plug is analogous to the spark plug of an Otto cycle engine in that is functions to provide a spark discharge to initiate combustion of the fuel mixture in the engine combustion chamber. Ignition systems for turbine engine ignition systems supply spark continuously to the engine instead of supplying spark in timed relationship to the engine cycle and in that the energy and instantaneous power requirements for a turbine engine system are much higher than those of an Otto cycle engine system.

The lack of a requirement to supply timed spark in a turbine ignition system leads to certain simplifications in the exciter circuit, among which is the use of a control spark gap to initiate discharge of the storage capacitor. The control spark gap normally comprises a pair of substantial electrodes enclosed in a gas tight housing together with some type of radioactive emitter of beta particles. The beta particles ionize the gas within the housing to promote discharge through the gap at more uniform voltage levels.

Control spark gaps create service problems in turbine ignition systems. Spark erosion of the electrodes necessitates more frequent replacement of the spark gaps than is desirable and the radioactivity of material used in the gaps demands that special procedures be used in the manufacture, storage, handling and disposition of the gaps. For these reasons, consideration has been given in the past to replacement of the control spark gap with an alternative form of switching device, such as a silicon controlled rectifier (SCR).

SCRs have been used as capacitor switching devices in prior capacitive discharge ignition systems designed for use in Otto cycle engines. Two examples of such ignition systems are seen in U.S. Pat. No. 4,232,646 for "Ignition System for Internal Combustion Engines with a Magneto Generator", issued Nov. 11, 1980 and in U.S. Pat. No. 3,605,714 for "contactless Ignition System", issued Sept. 20, 1971. In each of these patents a single SCR is connected in series with the storage capacitor and the primary of an ignition transformer. At the appropriate time in the engine cycle a trigger pulse is applied to the gate electrode of the SCR, switching it into conduction and discharging the storage capacitor through the ignition transformer to generate an engine spark.

The Otto cycle engine circuits use low voltage SCRs to switch the low voltage side of an ignition coil to develop a current limited, low instantaneous power, high voltage pulse for the spark plug. Such circuits were not designed for, nor can they deliver the required instantaneous power to fire a turbine engine igniter plug effectively.

The arrangements of the referenced systems do not provide failsafe operation in the event of the occurrence of an anode-cathode short circuit in the SCR and such short circuits are the most common modes of failure in such devices.

It is an object of the present invention to provide an ignition system for a gas turbine engine which does not require the use of control spark gaps.

It is a further object of the invention to provide an ignition system of the capacitive discharge type for a gas turbine engine in with SCRs are used as capacitor switching devices.

It is still another object of the invention to provide a capacitive discharge ignition system in which SCRs are used as capacitor switching devices and in which the SCRs are connected in circuit in such manner as to provide for continued operation of the system in the event of a short circuit failure of one or more, but less than all, of the SCRs.

BRIEF DESCRIPTION OF THE INVENTION

Briefly, the invention comprises an exciter circuit for a gas turbine engine ignition system in which a storage capacitor is charge continuously from a source of high voltage d.c. Two or more SCRs are connected in series between the terminal of the storage capacitor connected to the high voltage d.c. source and one terminal of a high voltage conditioning circuit. The remaining terminals of the storage capacitor and the conditioning circuit are returned to the high voltage source through ground. A protective network is connected in ladder fashion across the SCRs to distribute the charge voltage of the storage capacitor equally across the SCRs when the latter are nonconductive.

A pulse generator supplies periodic triggering pulses simultaneously to the SCRs to render the SCRs simultaneously conductive and thereby rapidly discharge the storage capacitor through the conditioning circuit. The output of the conditioning circuit is connected to an igniter plug located in the engine combustion chamber to provide ignition spark. If one or more, but less than all, of the SCRs should fail by short circuit, the remaining unaffected SCRs continue to operate to interrupt discharge current from the storage capacitor and thereby provide high energy, rapidly rising current impulses to the conditioning circuit.

DESCRIPTION OF THE DRAWING

The single figure of the drawings is a schematic diagram, partially in block diagram form, of the invention.

DESCRIPTION OF THE PREFERRED EMBODIMENT

Figure 1:
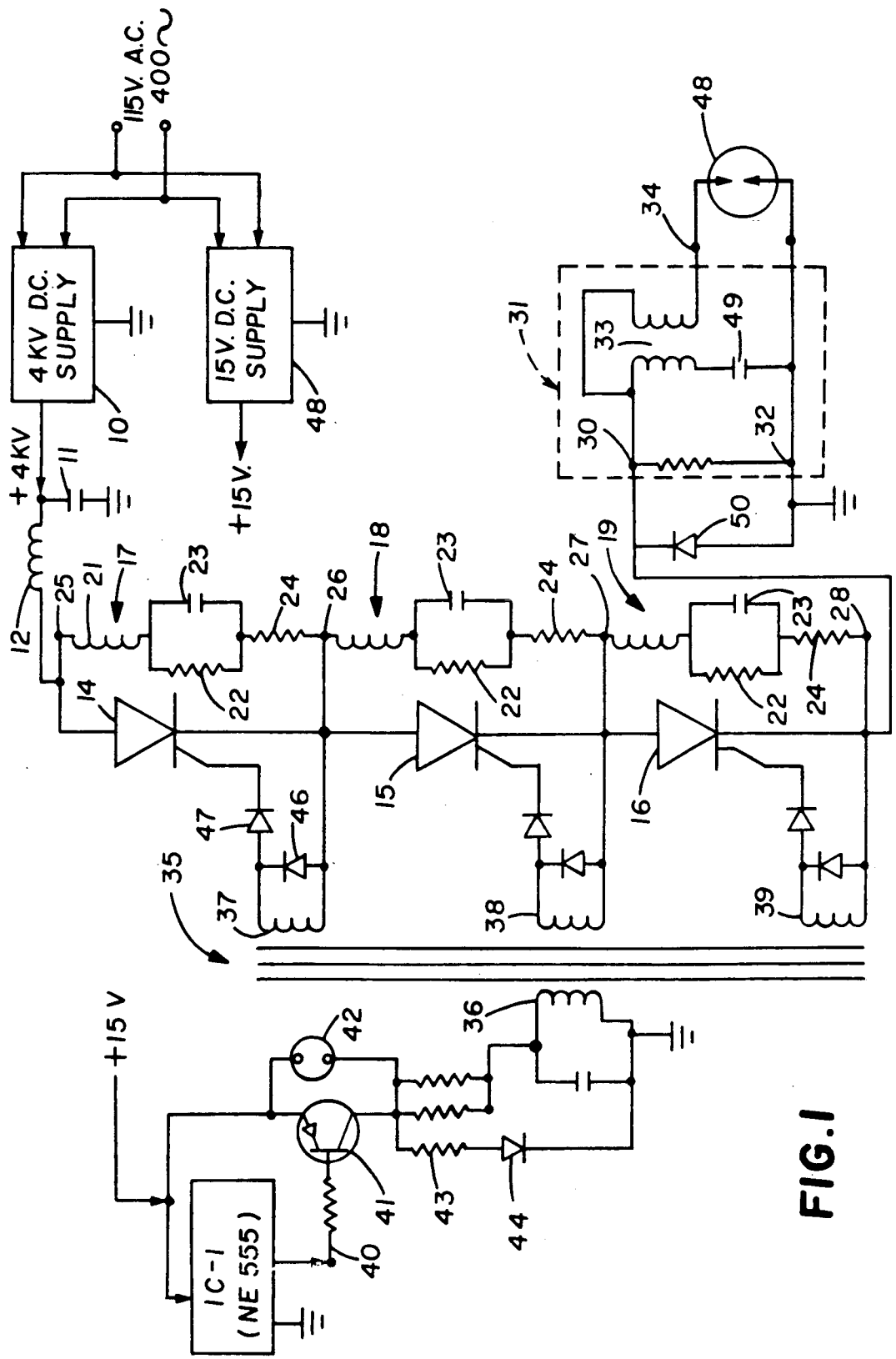

Referring to the drawing, a high voltage d.c. power supply 10 receives 115 v., 400 Hz a.c. input and converts the same into high voltage d.c., preferably 4 Kv. d.c. A storage capacitor 11 connected between the positive output terminal of supply 10 and ground receives continuous charging current from supply 10 until charged to 4 Kv. Capacitor 11 may suitably have a value of 1 mfd. The positively charged terminal of capacitor 11 is connected through a commutating inductor 12 to the anode of a first SCR 14. The cathode of SCR 14 is connected to the anode of a second SCR 15, the cathode of which is connected to the anode of a third SCR 16.

A protective network comprised of three identical, series connected sections 17, 18 and 19 extends in parallel with the series connected SCRs 14-16. Each of the network sections 17-19 comprises an inductor 21, a resistor 22 connected in parallel with a capacitor 23 with the upper node of the parallel combination connected in series with inductor 21 and with the lower node of the combination connected in series with a second resistor 24. The upper end 25 of network section 17 is connected to the anode of SCR 14. The lower end 26 of network section 17, which is also the upper end of network section 18, is connected to the line interconnecting the cathode of SCR 14 and the anode of SCR 15. Similarly, the lower end of section 18 - upper end 27 of section 19 is connected to the line interconnecting the cathode of SCR 15 and the anode of SCR 16.

The cathode of SCR 16 is connected to one input terminal 30 of the conditioning circuit 31. The other input terminal 32 of conditioning circuit 31 is grounded. Conditioning circuit 31 functions to reshape the substantially rectangular waveform of the discharge current from storage capacitor 11 to insert at the leading edge thereof an extra high voltage, very short duration spike. The reshaped waveform promotes ionization of the gases surrounding the engine igniter plug and improves the efficiency of the spark discharge through the igniter plug.

Terminal 30 is connected to one end of the primary winding of a transformer 33. The other end of the primary wiring is grounded through a capacitor 49. One end of the secondary winding of transformer 33 is connected to the input end of the primary winding thereof and the opposite end of the secondary winding is connected through output terminal 34 to one electrode of an igniter plug 48 located in the engine combustion chamber. The other electrode of igniter plug 48 is grounded. The cathode of a diode 50 is connected to the input end of the primary of transformer 33. The anode of diode 50 is grounded. Diode 50 damps the negative voltage induced at the input end of the primary of transformer 33 when the discharge pulse from storage capacitor 11 ends, preventing damage to the SCRs and improving the efficiency of the conditioning circuit.

A pulse transformer 35 having a single primary winding 36 and three secondary windings 37-39 supplies simultaneous trigger impulses to the gates of SCRs 14-16 when a trigger pulse is applied to primary winding 36. Trigger pulses are generated by a commercially available integrated circuit IC-1, suitably type NE 555, a product of National Semiconductor Corp., Santa Clara, Calif. IC-1 is adjusted to generate negative-going pulses on line 40 at a rate of from 2-4 p.p.s. The pulses on line 40 are fed to the base of a driver transistor 41 for amplification prior to application to input winding 36 of pulse transformer 35. Transistor 41 is protected against the application of overvoltage by a spark gap 42 and against the application of reverse currents by a resistor 43 - diode 44 combination connected from the collector of transistor 41 to ground.

The secondary windings 37-39 of pulse transformer 35 are respectively connected between the gate and cathode electrodes of SCRs 14-16 and are phased with respect to primary winding 36 to generate a positive-going pulse at the SCR gates when a trigger pulse is applied to primary 36. The positive pulses on the gates of the SCRs switch them into conduction simultaneously to rapidly discharge the charge on capacitor 11 through the conditioning circuit 31 and generate an ignition spark at igniter plug 33. At the end of the surge of discharge current, the reverse voltages induced in inductor 12 and the inductors 21 of network sections 17-19 momentarily reverse bias SCRs 14-16 and render them again nonconductive until the appearance of the next trigger pulse.

Diodes 46 and 47 connected in each of the circuits of secondary windings 37-39 protect against the application of reverse currents to the gates of the respective SCRs. IC-1 and transistor 41 receive input power at +15 V. from a 15 v.d.c. regulated supply powered by the 115 v.a.o source.

Again referring to network sections 17-19, resistors 22 and 24 in the series connected network sections form a voltage divider which divides the voltage of the charge stored on capacitor 11 equally across SCRs 14-16 when the SCRs are nonconductive. Capacitors 23 provide protection against the appearance of excessive voltage across any of the SCRs 14-16 which may be slow in switching. Inductors 21 and resistor 22 provide di/dt and current limiting when capacitors C23 discharge. In the specific embodiment of the invention disclosed, each of the SCRs is stressed only to the extent of one-third of the total charge voltage of capacitor 11. Moreover, should one or more, but less than all, of the SCRs 14-16 fail by short circuit, the remaining unaffected SCR will still function to provide engine spark.

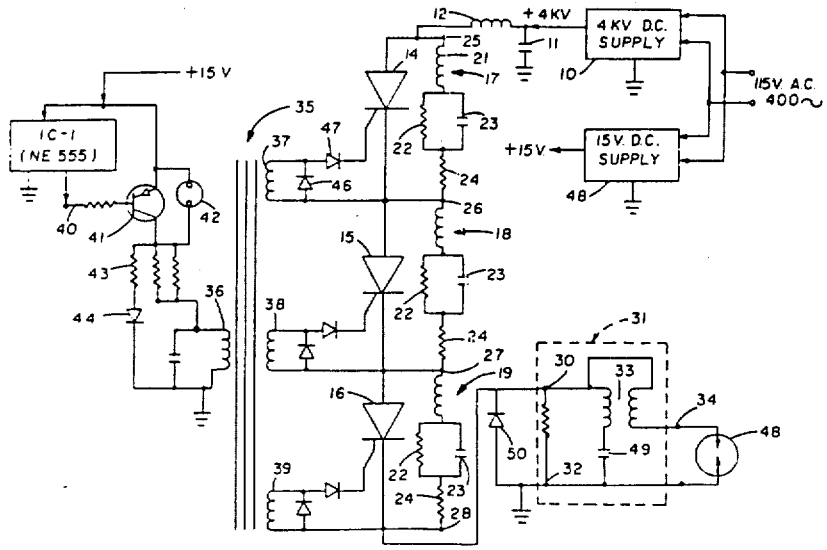

What is claimed is:

1. A gas turbine engine ignition system comprising:
   a storage capacitor having a capacity to store at least 0.2 joules of energy;
   a regulated power supply for charging the storage capacitor to its full capacity;
   a high-voltage conditioning circuit for receiving the energy stored in the storage capacitor;
   an igniter plug responsive to the conditioning circuit for generating a spark that ignites fuel in the turbine engine;
   at least two solid state switches in a series connection and further connected in series with the storage capacitor and an input of the conditioning circuit;
   means for substantially simultaneously applying triggering signals to gates of the solid state switches to render the series connection conductive and thereby discharge the at least 0.2 joules of energy stored in the storage capacitor through each of the solid state switches and the conditioning circuit and into the igniter plug; and
   means for generating the triggering signals independently of the level of charge of the storage capacitor.

2. An ignition system as claimed in claim 1 including a network in parallel with the series connection of solid state switches for distributing the stress placed on the switches by the energy held in the storage capacitor such that all of the solid state switches are stressed approximately equally.

3. An ignition system as claimed in claim 2 wherein the network is comprised of a plurality of like sections each associated with one of the solid state switches.

4. An ignition system as claimed in claim 2 wherein each of the sections of the network includes an inductor and a resistor connected in series.

5. An ignition system as claimed in claim 4 wherein each of the sections of the network includes a capacitor, the capacitor of each of the sections being connected in parallel with the resistor of the section.

6. An ignition system as claimed in claim 1 wherein the means for applying a triggering voltage includes:
 a pulse transformer, the pulse transformer having a primary winding and a plurality of secondary windings, the secondary winding being equal in number to the number of the solid state switches in the system;
 each of the secondary windings having a first and a second output terminal;
 the secondary windings being arranged to produce outputs of the same phase at each of the first output terminals thereof;
 the secondary windings being arranged to produce outputs of the same phase at each of the first output terminals thereof;
 the first and second output terminals of each of the secondary windings being respectively connected to a gate and a cathode electrodes of a separate one of the solid state switches.

7. An ignition system as claimed in claim 1 wherein a energy conducted by the solid state switches from the storage capacitor into the conditioning circuit when the solid state switches are rendered conductive is a pulse of current having a substantially rectangular waveform and wherein the conditioning circuit reshapes the current waveform to provide an extra high voltage, short duration spike at the leading edge thereof.

8. An ignition system as claimed in claim 7, wherein a transformer of the conditioning circuit includes:
 a primary winding and a secondary winding with one end each of the primary winding and the secondary winding being connected together to form the input connection of the conditioning circuit;
 the conditioning circuit further including:
  a conditioning capacitor having input and output terminals;
  the end of the primary winding of the conditioning circuit transformer opposite the one end thereof being connected to the input terminal of the conditioning capacitor;
  the output terminal of the conditioning circuit capacitor being grounded;
  the end of the secondary winding of the conditioning circuit transformer opposite the one end thereof forming the output connection of the conditioning circuit;
  the igniter plug having a pair of discharge electrodes; and
  one of the discharge electrodes being connected to the conditioning circuit output terminal, the other of the discharge electrodes being grounded.

9. An ignition system as claimed in claim 8 with additionally:
 a damping diode;
 the damping diode being connected between the input connection of the conditioning circuit and ground to damp oscillations in the conditioning circuit.

10. An ignition system as claimed in claim 8 wherein said means for applying a triggering voltage includes:
 a pulse transformer;
 the pulse transformer having a primary winding and a plurality of secondary windings, the secondary windings being equal in number to the number of the solid state switches in the system;
 each of the secondary windings having a first and a second output terminal;
 the secondary windings being arranged to produce outputs of the same phase at each of the first output terminals thereof;
 the first and second output terminals of each of the secondary windings being respectively connected to a gate and a cathode electrodes of a separate one of the solid state switches.

11. An ignition system as claimed in claim 10 wherein the means for applying a triggering voltage includes:
 a pulse generator;
 the pulse generator being of the free running type and being arranged to supply input pulses to the primary windings of the pulse transformer.

12. An ignition system as claimed in claim 11 wherein the pulse generator operates to generate pulses at a rate of from about two to four pulses per second.

13. An ignition system as claimed in claim 1 wherein the solid state switches are semiconductor controlled rectifiers (SCRs).

14. An ignition system as claimed in claim 13 wherein at least two SCRs connected in series comprise the at least one solid state switch.

* * * * *

UNITED STATES PATENT AND TRADEMARK OFFICE
CERTIFICATE OF CORRECTION

PATENT NO.　　: 5,053,913

DATED　　　　 : October 1, 1991

INVENTOR(S) : Bruce E. Dolmovich, et al.

It is certified that error appears in the above-identified patent and that said Letters Patent is hereby corrected as shown below:

Title page should be deleted to appear as per attached title page.

Signed and Sealed this

Ninth Day of February, 1993

Attest:

STEPHEN G. KUNIN

*Attesting Officer*　　　　Acting Commissioner of Patents and Trademarks

United States Patent [19]
Dolmovich et al.

[11] Patent Number: 5,053,913
[45] Date of Patent: Oct. 1, 1991

[54] CAPACITIVE DISCHARGE IGNITION EXCITER USING SCR DISCHARGE SWITCHES

[75] Inventors: Bruce E. Dolmovich, Jacksonville; Michael A. Crough, Ponte Vedra Beach; Steve Kempinski, Jacksonville; Roy Lozito, Orange Park, all of Fla.

[73] Assignee: Unison Industries Limited Partnership, Jacksonville, Fla

[21] Appl. No.: 312,215

[22] Filed: Feb. 17, 1989

[51] Int. Cl.$^5$ ............................................. F23Q 3/00
[52] U.S. Cl. .................................. 361/257; 361/254; 361/256; 123/143 B
[58] Field of Search ............... 361/247, 253, 254, 255, 361/256, 257; 123/143 B, 598; 60/39.827, 39.141

[56] References Cited

U.S. PATENT DOCUMENTS

| | | | |
|---|---|---|---|
| 3,531,738 | 9/1970 | Thakore | 331/111 |
| 3,605,714 | 9/1971 | Hardin et al. | 123/598 |
| 3,619,638 | 11/1971 | Phinney | 307/86 |
| 4,398,128 | 8/1983 | Wollank | 315/158 |
| 4,432,646 | 11/1980 | Asai | 123/600 |
| 4,457,285 | 7/1984 | Hamei et al. | 123/598 |
| 4,705,013 | 11/1987 | Minks | 123/598 |
| 4,839,772 | 6/1989 | Choi et al. | 361/256 |
| 4,983,886 | 1/1991 | Balland | 361/257 |

OTHER PUBLICATIONS

Silicon Controlled Rectifier Designer's Handbook by Westinghouse Electric Corporation, (Sep. 1970), Leslie R. Rice, Editor, 2nd Edition, W.E. Semiconductor Division, Youngwood, Pa., pp. (9-1)-(9-5).

*Primary Examiner*—A. D. Pellinen
*Assistant Examiner*—Jeffrey A. Gaffin
*Attorney, Agent, or Firm*—Leydig, Voit & Mayer

[57] ABSTRACT

An exciter circuit for a gas turbine engine ignition system. A high voltage supply continuously charges a storage capacitor. A plurality of silicon controlled rectifiers (SCRs) are connected in series between the storage capacitor and a high voltage conditioning circuit. A multi-section protective network is connected in parallel with the series connected SCRs. Individual network sections are connected across separate ones of the SCRs. The SCRs are normally non-conducting and are periodically triggered to discharge the storage capacitor into the conditioning circuit. An igniter plug is connected to the output of the conditioning circuit. The protective network divides the voltage of the storage capacitor equally across the SCRs when the latter are non-conductive thereby reducing the voltage stress to which each of the SCRs is subjected.

14 Claims, 1 Drawing Sheet